March 10, 1959  L. B. CULLEY  2,877,318
WATER LEVEL INDICATORS FOR MOTOR VEHICLES
Filed March 26, 1956

INVENTOR.
LEE B. CULLEY
BY Peter Haberlin
ATTORNEY

United States Patent Office 2,877,318
Patented Mar. 10, 1959

2,877,318
WATER LEVEL INDICATORS FOR MOTOR VEHICLES

Lee B. Culley, Portland, Oreg.

Application March 26, 1956, Serial No. 573,686

1 Claim. (Cl. 200—84)

This invention relates to water level indicators for motor vehicles, but more particularly to a type of signal to be governed by a float affixed to the radiator of a motor vehicle for the purpose of indicating the water level in said radiator by lighting a lamp located on the instrument panel when the water falls to an unsafe level.

One object of the disclosed embodiment of this invention is to provide a float which is affixed to a motor vehicle radiator so arranged that the radial movement of said float travels only a predetermined distance between the point of contact of a relay system and a rod attached to the structure which stops the movement of the lever to which the float is attached, and again;

To provide a structure of this kind that is adapted to be easily applied to the standard type of radiators and instrument panels used in modern motor vehicles, and further;

To provide means to apprise the driver of the vehicle of the danger level of the water by a light signal which automatically flashes in the instrument panel, and yet;

To provide a float controlled signal having a float member within the radiator which operates the mechanisms attached without the radiator by means of a radially movable shaft passing through the back plate of said radiator and through a stuffing box which seals the water from leakage.

Other objects and advantages of this invention will become apparent in the following specification and appended claim which taken in connection with the accompanying drawing forms part of this application, of which Fig. 1 shows a back elevation of a motor vehicle radiator with a preferred form of the invention attached thereto:

Figure 1:
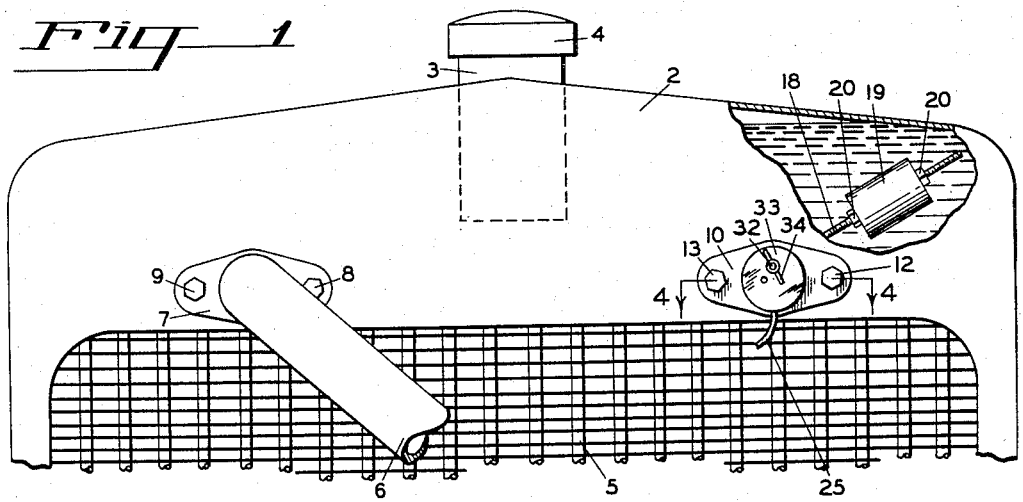
Figure 2:
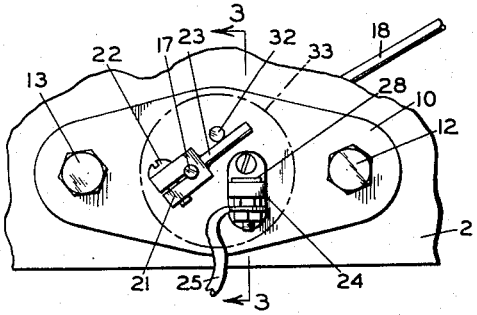
Fig. 2 shows a fragmentary view of same with the cover of the mechanism removed.

Now with more detailed reference to the drawing, in which like numerals of reference indicate like parts, the numeral 2 shows a radiator housing with water inlet pipe 3 affixed therein, while detachable cap 4 is placed atop said pipe, and the standard form of grill is designated by the numeral 5.

An inlet pipe 6 is attached to radiator housing 2 by means of a flange which is affixed to one end of said pipe and threaded to the back of said housing by means of screws 8—9, while at an opposite location on the back of the housing and in longitudinal alinement with said pipe flange, a base plate 10 separated by gasket 11 is fastened to the back wall of said radiator by means of screws 12—13.

A cylindrical journal 14 is threaded through base plate 10 from the inside of housing 2 and affixed to a predetermined location relative to said base plate by means of hexagon nut 15, while the end of journal 14 which extends through base plate 10 has threaded thereto a stuffing box 16, radially supporting shaft 17 which has a right angular arm 18 extending therefrom and into radiator 2. A float 19 is passed over the free end of arm 18 and fixed in longitudinal relation therewith by means of nuts 20, while split clamp 21 is fastened to shaft 17 by screw 22, and integral contact finger 23 extends from said shaft.

An inverted T-shaped dielectric binding post 24 is screwed to base plate 10 with cable 25 attached to one side thereof and leading to signal light 29 to battery 26 by way of conductor 27. When float 19 falls to the danger level and finger 23 contacts bar 28 the lamp 29 will be lighted from the battery 26, conductor 27, conductor 25, contact bar 28 through the contact finger 23 to the ground 31.

Figure 3:
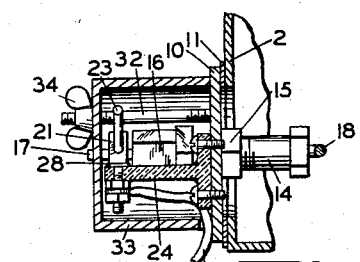
Fig. 3 is a transverse section, taken on line 3—3 of Fig. 2.
Figure 5:
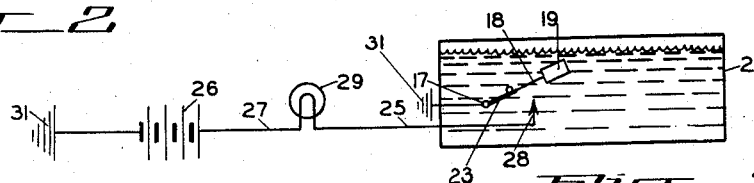
Fig. 5 is a diagram showing the circuit connecting the lamp and float.
Figure 4:
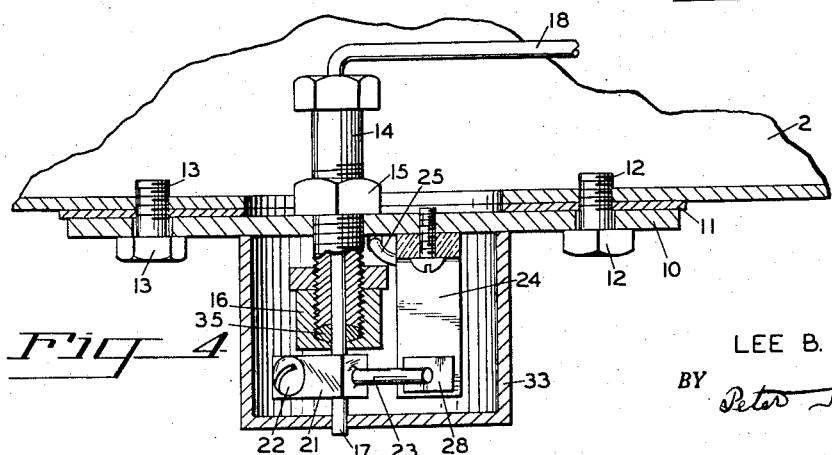
Fig. 4 is an enlarged longitudinal section taken on line 4—4 of Fig. 1.

A pin 32 is screwed into the base plate 10 and serves as a means to limit the upward movement of arm 18, while also serving as a locator for cover 33 which encloses the operating mechanisms which extend without the radiator. When cover 33 is located in place as shown in Fig. 3, a threaded portion of pin 32 extends beyond the end of said cover, and to which wing nut 34 is screwed for the purpose of holding said cover in contact with base plate 10.

It will be noted that base plate 10 is located as near as practicable to the bottom level of the water in order to prevent unnecessary radial movement of float 19; a desideratum of economy of wear both on the shaft 17 and journal 14, while leakage is also prevented between the journal and shaft by packing 35 which surrounds a portion of said shaft in stuffing box 16.

While this invention has been described in detail and with specific illustrations, it is understood that other modifications in construction and arrangement of parts may be devised without departing from the spirit and scope of the invention. The present embodiment is illustrative but not restrictive, since the scope and purview of the invention is indicated by the appended claim rather then by the foregoing description.

Having thus fully illustrated and described an embodiment of the invention and a method of producing the same, in a manner that may enable others skilled in the art to which it appertains to construct and use the same, what is claimed and desired to be secured by Letters Patent, is:

A float controlled electric switch adapted to be attached to a motor vehicle having a dashboard and radiator, comprising a signal light attached to said dashboard, a base plate affixed to an outer portion of said radiator and insulated therefrom, a detachable cover superimposed on the base plate, a pin threaded to the base plate and extending therefrom through the cover, a wing nut registering with the free end of said pin to hold the cover in contact with the base plate, a journal attached within the cover and extending into the radiator, a shaft radially operable in said journal, a float-carrying right-angular arm integral with said shaft, a finger attached to said shaft within the cover, a dielectric binding post affixed within said cover, a cable attached to said binding post leading to the signal light, and a bar affixed to said binding post which is contacted by the finger to flash said signal light when the float reaches the low water level.

References Cited in the file of this patent

UNITED STATES PATENTS

| | | |
|---|---|---|
| 742,219 | O'Connor et al. | Oct. 27, 1903 |
| 1,138,285 | Green | May 4, 1915 |
| 1,802,383 | Jarvis | Apr. 28, 1931 |
| 2,278,279 | Morris | Mar. 31, 1942 |
| 2,467,189 | Cohen et al. | Apr. 12, 1949 |